United States Patent [19]
Mallozzi et al.

[11] 3,778,585
[45] Dec. 11, 1973

[54] PROTECTION DEVICE FOR PREVENTING DAMAGE TO RADIATION SOURCE FROM BACKSCATTER

[75] Inventors: Philip J. Mallozzi; Harold M. Epstein; Craig T. Walters; David C. Applebaum, all of Columbus; William J. Gallagher, Worthington, all of Ohio

[73] Assignee: Battelle Memorial Institute, Columbus, Ohio

[22] Filed: Apr. 21, 1972

[21] Appl. No.: 246,161

[52] U.S. Cl....... 219/121 LM, 331/94.5 A, 350/160
[51] Int. Cl............................................ B23k 27/00
[58] Field of Search................. 331/94.5 A, 94.5 Q; 219/121 L, 121 EB; 350/160

[56] References Cited
UNITED STATES PATENTS

| | | | |
|---|---|---|---|
| 3,622,739 | 11/1971 | Steffen | 219/121 L |
| 3,301,624 | 1/1967 | Morriss, Jr. | 350/160 R |
| 3,561,842 | 2/1971 | Horton | 350/160 R |
| 3,575,490 | 4/1971 | Reisman | 350/160 R |
| 3,578,842 | 5/1971 | Holland | 350/160 R |
| 3,602,576 | 8/1971 | Kohler | 350/160 R |

*Primary Examiner*—C. L. Albritton
*Assistant Examiner*—George A. Montanye
*Attorney*—William J. Mase et al.

[57] ABSTRACT

Methods and apparatus for directing an incident radiation pulse from a laser to a target and preventing any substantial backscattering of the radiation along the reverse path.

A beam splitter directs a major portion of the incident pulse energy in a main path beginning in one direction and a minor portion in a secondary path beginning in a different direction.

The front surface of a layer of copper having high reflectivity is located in the main path to direct the major energy portion on to the target, and a layer of germanium having high absorptivity to the radiation is located with its front surface adjacent the back surface of the copper layer. Mirrors in the secondary path direct the minor energy portion over a longer route to strike the back surface of the germanium layer in the region of the main path, after the entire main pulse has been reflected from the copper surface and before any pulse energy backscattered from the target has reached it.

The absorptivity of the germanium layer and the energy of the minor portion are sufficient to distort the surface of the copper in the region struck, and thus to reduce the reflection along the reverse path sufficiently to prevent any substantial portion of the backscattered energy from reaching the laser.

Alternatively, the germanium layer is omitted and the minor energy portion actuates an electrical discharge to vaporize the copper surface.

34 Claims, 2 Drawing Figures

PROTECTION DEVICE FOR PREVENTING DAMAGE TO RADIATION SOURCE FROM BACKSCATTER

BACKGROUND OF THE INVENTION

A problem plaguing laser generated plasma research at high powers is damage to laser rods by laser light backscattered from the target. As is discussed in Laser Focus 6 (No. 11), 41 (1970), this has forced many experiments to be performed at power levels far below the capability of the available laser systems. For example, a typical multistage neodymium doped glass laser operating in the 100 joule per nanosecond mode will be damaged if about 0.01 joule is reflected back along the optical path by the target. Th 0.01 joule pulse, although distributed over approximately 30 square centimeters of glass when it reenters the last amplifier, will converge and be amplified as it retraces the optical path, and at some point will exceed the 10 joule per square centimeter damage threshold as it funnels through smaller and smaller diameter rods.

It would appear that the laser could be protected most simply by introducing an electro-optical shutter after the last stage. The shutter would transmit the forward pulse but be switched off before the return of the backscattered pulse. Unfortunately, the construction of Kerr or Pockels cells large enough to handle large diameter beams is very difficult and expensive. In a somewhat more attractive scheme, discussed by P. K. Fong in Rev. Sci. Instr. 41, 1434 (1970), a large multipass Faraday rotator and polarizers are utilized. But even Faraday rotators have drawbacks for large lasers, owing to the difficulty of establishing the large volume, strong, uniform magnetic fields which are required. Citing the most intractable case, the cost of constructing such a device for a large disk laser would probably be prohibitive.

Methods and apparatus according to the present invention have proved to be especially advantageous for isolating high power Q-switched lasers of any aperture from target backscatter, and thus protecting them from damage. The invention is useful also with a wide variety of other radiation sources.

SUMMARY OF THE INVENTION

A typical method according to the present invention for directing an incident radiation pulse from a source to a target and preventing any substantial backscattering of radiation along the reverse path, comprises positioning in the path of the incident pulse from the source a surface comprising a material having high reflectivity to direct the pulse along a main path to the target, directing a minor portion of the incident pulse energy from the source along a secondary path, and using the energy of the minor portion to actuate a substantial alteration of the surface in the region of the main path, after the entire pulse has been reflected from the surface and before any pulse energy backscattered from the target has reached the surface, to reduce the reflection along the reverse path from the surface in said region sufficiently to prevent any substantial portion of the backscattered energy from reaching the source.

In one typical use of the method, the minor energy portion actuates an electrical discharge to vaporize at least substantially the surface in the region of the main path. Another preferred way of altering the surface is summarized hereinafter.

Typical apparatus according to the invention for directing an incident radiation pulse from a source to a target and preventing any substantial backscattering of radiation along the reverse path, comprises reflecting means comprising a surface of a material having high reflectivity located to direct a major portion of the pulse energy along a main path to the target, means for directing a minor portion of the incident pulse energy in a secondary path, means in the secondary path responsive to the minor portion of the pulse energy for actuating a substantial alteration of the reflecting surface in the region of the main path, after the entire pulse has been reflected from the surface and before any pulse energy backscattered from the target has reached the surface, to reduce the reflection along the reverse path from the surface in said region sufficiently to prevent any substantial portion of the backscattered energy from reaching the source.

In one typical form of the apparatus, the means responsive to the minor energy portion provides an electrical discharge in the region of the main path at the reflecting means to vaporize at least substantially the surface in said region. Another preferred means is summarized in detail hereinafter.

A typical preferred form of the present method of directing an incident radiation pulse from a source to a target and preventing any substantial backscattering of raidation along the reverse path, comprises positioning in the path of the incident pulse from the source a surface comprising a first layer of a material having high reflectivity on its front to direct the pulse along a main path to the target, and having a second layer comprising a material of high absorptivity to the radiation behind and adjacent the first layer, and directing a minor portion of the incident pulse energy from the source along a secondary and longer path so as to strike the second layer from behind in the region of the main path after the entire pulse has been reflected from the first layer and before any pulse energy backscattered from the target has reached the first layer, the absorptivity of the second layer and the energy of the minor portion being sufficient to substantially alter the first layer in the region struck by the minor energy portion and thus to reduce the reflection along the reverse path from the front surface in said region sufficiently to prevent any substantial portion of the backscattered energy from reaching the source. The minor portion of the pulse energy typically is about 10 to 25 percent of the total incident pulse energy. The method typically comprises the further step of moving the surface afterward to locate an intact area thereof substantially at the junction of the main and secondary paths, and then repeating the other steps.

A typical preferred form of the present apparatus for directing an incident radiation pulse from a source to a target and preventing any substantial backscattering of radiation along the reverse path, comprises means for directing a major portion of the incident pulse energy in a main path beginning in a first direction and a minor portion in a secondary path beginning in a second direction, reflecting means comprising the front surface of a first layer of a material having high reflectivity located in the main path to direct the major portion of the pulse energy along the main path to the target, surface-altering means comprising a second layer of a material having high absorptivity to the radiation adjacent the back surface of the first layer, means located in the secondary path for directing the minor portion of the pulse energy over a longer route to the reflecting means to strike the second layer in the region of the main path, but on the side thereof that is away from the first layer, after the entire pulse has been reflected from the first layer and before any pulse energy backscattered from the target has reached the first layer, the absorptivity of the second layer and the energy of the minor portion being sufficient to substantially alter the first layer in the region struck by the minor energy portion and thus to reduce the reflection along the reverse path from the front surface in said region sufficiently to prevent any substantial portion of the backscattered energy from reaching the source.

Typically the radiation source is a laser, the minor portion of the pulse energy is about 10 to 25 percent of the total incident pulse energy, and the surface-altering means causes a distortion in the front surface of the first layer. The directing means typically comprises a beam splitter that is movable to control the ratio of the major portion to the minor portion of the energy.

In typical reflecting means in the apparatus, the first layer comprises copper, gold, or silver, and the second layer comprises germanium, silicon, lead sulphide, iron oxide, lead, tin, or cadmium. In a presently preferred embodiment, the second layer comprises a coating consisting essentially of germanium on a transparent support and the first layer comprises a coating consisting essentially of copper on the second layer. Where the radiation source is a neodymium laser, the second layer typically comprises a vacuum deposited coating consisting essentially of germanium about 500 to 2,000 Angstroms thick on a substantially optically flat transparent support and the first layer comprises a vacuum deposited coating consisting essentially of copper about 1,000 to 5,000 Angstroms thick on the second layer. The energy of the minor portion typically is sufficient to remove a substantial portion of the first layer from the transparent support.

The directing means in the secondary path typically comprises at least one reflector, and for convenience, adjustable delay means may be provided in the secondary path. The adjustable means typically comprises a reflector and means for controlling its position.

The apparatus may comprise also a nonlinear absorber in the main path that absorbs a substantially greater proportion of a low flux pulse than of a high flux pulse. The nonlinear absorber typically comprises a solution of a bleachable dye such as phthalocyanine or cryptocyanine. The nonlinear absorber typically is located either between the target and the reflecting means or between the directing means and the source.

The apparatus may comprise means in the main path for focusing the energy from the directing means through an aperture and means for recollimating the beam beyond the aperture. Typical focusing means comprises a lens and an iris, and the focusing preferably takes place in a vacuum. The lens preferably is located in a region of relatively low flux in the main path.

The apparatus may comprise means in the main path for focusing the energy from the directing means in a gaseous region such that energy in excess of a predetermined quantity will break down the gas and form a plasma so that, while the predetermined quantity of energy may continue on to the target, any energy backscattered from the target is blocked by the plasma from reaching the source. Such means typically includes an enclosure for the gaseous region, and the focal length of the focusing means and the gas pressure in the enclosure are selected such as to break down the gas and form the plasma after passage of the predetermined quantity of energy.

In typical embodiments of the apparatus, the reflecting surface means comprises a material that is affected by energy above an alteration threshold in such manner that its surface is altered, and thus its reflectivity is reduced, in any region impinged by such energy, whereby the beam reflected therefrom is substantially uniform even where the energy in a portion of the main beam incident thereon may be substantially above the alteration threshold.

DESCRIPTION OF PREFERRED EMBODIMENTS

Figures 1, 2:
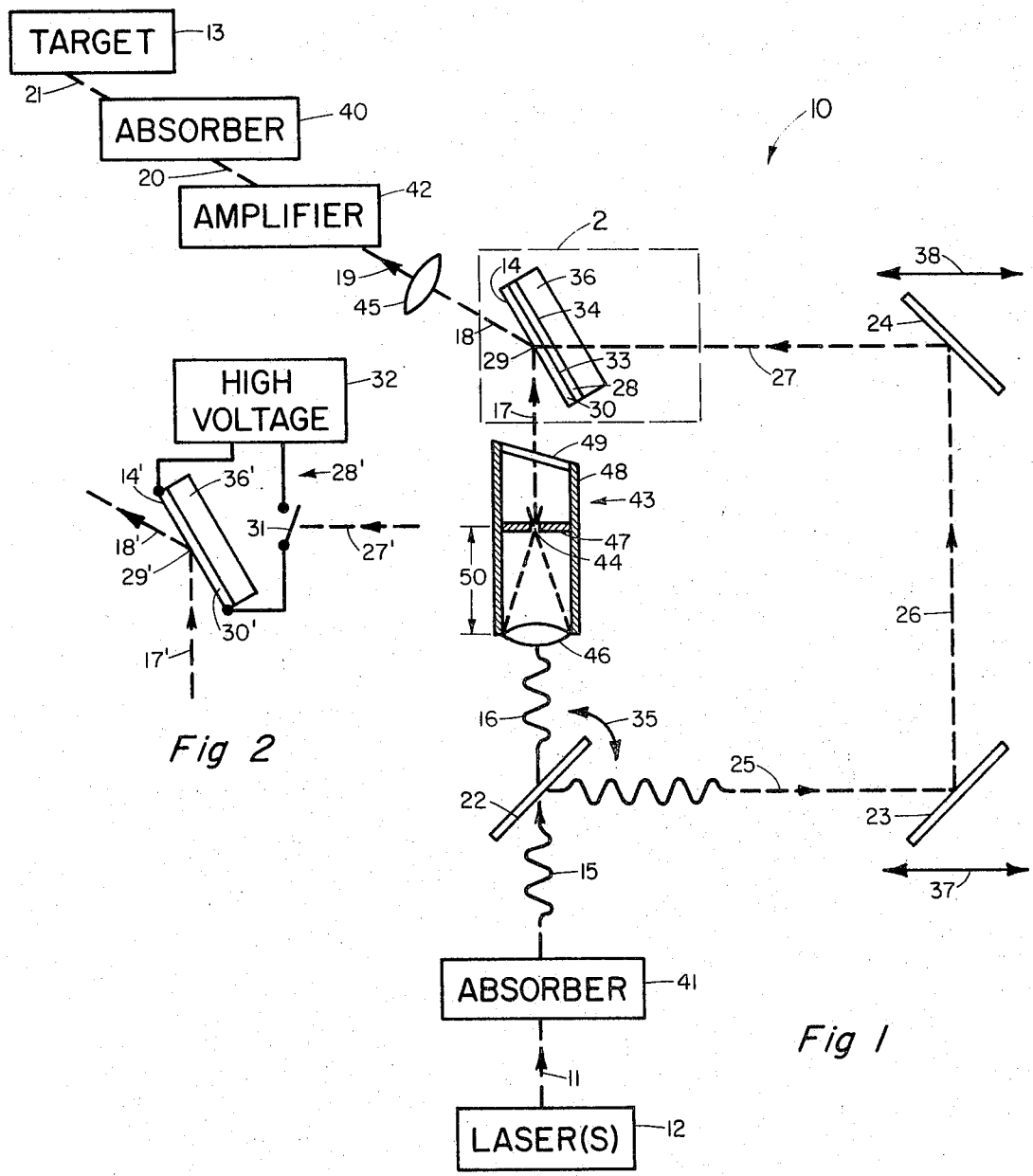
FIG. 1 is a schematic view illustrating typical embodiments of the present invention.
FIG. 2 is a schematic view of an alternative form of the portion of the apparatus in the rectangle 2 in FIG. 1.

FIG. 1 schematically illustrates typical apparatus 10 according to the present invention for directing an incident radiation pulse 11, from a source 12, such as a laser oscillator or a laser oscillator followed by any desired number of laser amplifiers, to a target 13, and preventing any substantial backscattering of radiation along the reverse path. In the apparatus 10 reflecting means comprising a surface 14 of a material having high reflectivity is located in the portion 17, 18 of a main path 15-21 to direct a major portion of the pulse energy along the main path 15-21 to the target 13.

Also included are means 22-24 for directing a minor portion of the incident pulse energy in a secondary path 25-27, and means 28 in the secondary path responsive to the minor portion of the pulse energy at 27 for actuating a substantial alteration of the reflecting surface 14 in the region 29 of the main path portion 17,18 after the entire pulse has been reflected from the surface 14 and before any pulse energy backscattered from the target 13 along the reverse path 21-18 has reached the surface 14, and thus to reduce the reflection along the reverse path 17-15 from the surface 14 in the region 29 sufficiently to prevent any substantial portion of the backscattered energy from reaching the source 12.

In further detail, the apparatus 10 in FIG. 1 includes means such as a beam splitter 22 for directing a major portion of the incident pulse energy in a main path beginning in a first direction as at 16 and a minor portion in a secondary path beginning in a second direction as at 25, reflecting means comprising the front surface 14 of the first layer 30 of a material having high reflectivity located in the main path, in the portions 17,18, to direct the major portion of the pulse energy along the main path portion 18-21 to the target 13. Means for altering the surface 14 of the first layer 30 comprises a second layer 28 of a material having high absorptivity to the radiation adjacent the back surface 33 of the first layer 30.

Means such as front surface mirrors 23,24 are located in the secondary path beginning at 25 for directing the minor portion of the pulse energy over a longer route 25,26,27 to the reflecting means 14 to strike the second layer 28 in the region 29 of the main path, but on the side 34 thereof that is away from the first layer 30, after the entire pulse has been reflected at 29 from the first layer 30 and before any pulse energy backscattered from the target 13 along the reverse path 21-18 has reached the first layer 30.

The absorptivity of the second layer 28 and the energy of the minor portion of the pulse energy at 27 are sufficient to substantially alter the first layer 30 in the region 29 struck by the minor energy portion 27 and thus to reduce the reflection at 29 along the reverse path at 18,17 from the front surface 14 in the region 29 sufficiently to prevent any substantial portion of the backscattered energy from reaching the source 12.

The minor portion of the pulse energy typically is about 10 to 25 percent of the total incident pulse energy, and the surface altering absorptive second layer 28 causes a distortion in the front surface 14 of the first layer 30. The directing means 22 may comprise any suitable beam splitter such as a partially reflecting mirror that transmits the major portion of the incident energy straight through it as indicated at 16 and reflects a minor portion of the energy as indicated at 25. The beam splitter 22 preferably is movable as indicated by the arrow 35 to vary its angle and thus to control the ratio of the major portion to the minor portion of the energy.

In typical reflecting means 14 of the apparatus 10, a first layer 30 comprises copper, gold, or silver, and the second layer comprises germanium, silicon, lead sulfide, iron oxide, lead, tin, or cadmium. In a presently preferred embodiment the second layer 28 comprises a coating consisting essentially of germanium on a transparent support 36 and the first layer 30 comprises a coating consisting essentially of copper on the second layer 28. Where the radiations source 12 is a neodymium laser, the second layer 28 typically comprises a vacuum deposited coating consisting essentially of germanium about 500 to 2,000 Angstroms thick on a substantially optically flat transparent support 36 and the first alyer 30 comprises a vacuum deposited coating consisting essentially of copper about 1,000 to 5,000 Angstroms thick on the second layer 28. The energy of the minor portion at 27 typically is sufficient to remove a substantial portion of the first layer 30 from the transparent support 36 in the region 29.

The directing means in the secondary path typically comprises not only the beam splitter 22 but also at least one reflector and preferably two such as the front surface mirrors 23,24 which serve also as adjustable delay means when provided with means for controlling their positions as indicated by the arrows 37 and 38.

In an alternative embodiment of apparatus as in FIG. 1 the reflecting means 14 and the surface altering means associated therewith as enclosed in the rectangle 2 are replaced by the apparatus illustrated schematically in FIG. 2, which alters the reflecting surface in a different manner. As shown in FIG. 2 the major portion of the incident pulse energy traveling along the main path at 17' is reflected as indicated at 29' from the front surface 14' of a reflecting layer 30' on a support 36' and continues along the main path at 18' toward the target 13. In FIG. 2 the surface altering means 28' comprises normally open switching means 31 such as a photoelectric cell or other suitable electronic or electromechanical means responsive to the minor portion of the pulse along the secondary path at 27' to complete the circuit between a high voltage source 32 and the reflecting layer 30'. Thus the means 28' responsive to the minor energy portion at 27' provides an electrical discharge from the high voltage source 32 in the region of the main path at 29' at the reflecting means 30' to vaporize at least substantially the surface 14' in the region 29', after the entire pulse has been reflected as indicated at 18' toward the target 13 and before any pulse energy backscattered from the target 13 has reached the reflecting surface 14'.

Referring again to FIG. 1, the apparatus 10 may include also a nonlinear absorber as at 40 or 41, or at each location 40,41 in the main path 15-21 that absorbs a substantially greater proportion of a low flux pulse than of a high flux pulse. The nonlinear absorber 40 or 41 typically comprises a solution of a bleachable dye such as phthalocyanine or cryptocyanine. It is possible that where the laser pulse energy entering the apparatus 10 as indicated at 11 from the source 12 should be unexpectedly low, say 25 percent or less of the expected level, the energy level along the secondary path at 27 may be insufficient to cause the absorptive layer 28 to alter the surface 14 substantially. In such a situation the backscattered energy probably would be too low to damage the laser or other apparatus, or would damage it only slightly. To protect against such possible damage, however, the nonlinear absorber 40 may be located as indicated between the target 13 and the reflecting means 14. In fact when a laser amplifier is provided between the reflecting means 14 and the target 13 as indicated at 42 the nonlinear absorber 40 should be between it and the target 13. Thus the high flux pulse along the main path 20,21 from the amplifier 22 to the target 13 is attenuated only negligibly or not at all by the nonlinear absorber 40, but the lower flux pulse backscattered along the path 21,20 from the target 13 is attenuated substantially by the absorber 40, protecting the amplifier 42 and all of the other apparatus along the backscatter path 21-15. In some cases the additional protection of a nonlinear absorber 41 may be desired between the directing means 22 and the source 12.

Protection against backscattering damage may be increased still further by providing in the main path 15-21 means 43 for focusing the energy from the directing means 22 through an aperture 44 and means such as a lens 45 for recollimating the beam beyond the aperture 44. Typical focusing means 43 comprises a lens 46 and an iris 47, either fixed or adjustable. Since any backscattered energy reaching the iris 47 is not in focus, only a negligible fraction of it, at most, can pass through the aperture 44 to continue along the path 16,15 to the source 12. The lens 46 is mounted with a gas-tight seal at one end of an impermeable tube 48 at the other end of which is mounted an inclined transparent window 49 with a gas-tight seal between it and the tube 48. The gas-tight enclosure thus formed is evacuated and then sealed so that the focusing takes place in a vacuum. The focusing lens 46 and the recollimating lens 45 should be located in regions of relatively low flux in the main path 15-21 to avoid any damage to them.

In an alternative form of the focusing means 43 the iris 47 is omitted and a suitable gas such as air, nitrogen, argon, helium, or neon is provided at a selected pressure within the sealed enclosure formed by the lens 46, the tube 48, and the window 49. With this variation, the apparatus 10 may be provided with means 43 in the main path 15–21 for focusing the energy from the directing means 22 in a gaseous region such that energy in excess of a predetermined quantity will break down the gas and form a plasma so that, while the predetermined quantity of energy may continue on to the target 13, any energy backscattered from the target 13 along the reverse path 21–17 is blocked by the plasma at the focus 44 from continuing along the path 16,15 and reaching the source 12. The focal length, as indicated at 50, of the focusing means 46 and the gas pressure in the enclosure 46,48,49 are selected such as to break down the gas and form the plasma after passage of the predetermined quantity of energy.

The reflecting surface 14 in FIG. 1 and the reflecting surface 14' in FIG. 2 typically comprise a material such as copper, gold, or silver that is affected by energy above an alteration threshold in such manner that its surface is altered, and thus its reflectivity is reduced, in any region impinged by such energy (flux exceeding the alteration threshold) commonly known as a hot spot, whereby the beam reflected from the surface 14 or 14' is substantially uniform even where hot spots are encountered, because a much lower proportion of the energy is reflected from the hot spots. Thus the pulse is substantially homogenized.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim

1. A method of directing an incident radiation pulse from a source to a target and preventing any substantial backscattering of radiation along the reverse path, comprising
    positioning in the path of the incident pulse from the source a surface comprising a material having high reflectivity to direct the pulse along a main path to the target,
    directing a minor portion of the incident pulse energy from the source along a secondary path, and
    using the energy of the minor portion to actuate a substantial alteration of the surface in the area that reflects the pulse in the main path, after the entire pulse has been reflected from the surface and before any pulse energy backscattered from the target has reached the surface, to reduce the reflection along the reverse path from the surface in said region sufficiently to prevent any substantial portion of the backscattered energy from reaching the source.

2. A method as in claim 1, wherein the minor energy portion actuates an electrical discharge to vaporize the surface at least substantially.

3. A method of directing an incident radiation pulse from a source to a target and preventing any substantial backscattering of radiation along the reverse path, comprising
    positioning in the path of the incident pulse from the source a surface comprising a first layer of a material having high reflectivity on its front to direct the pulse along a main path to the target, and having a second layer comprising a material of high absorptivity to the radiation behind and contacting the first layer, and
    directing a minor portion of the incident pulse energy from the source along a secondary and longer path so as to strike the second layer from behind in the area that reflects the pulse in the main path after the entire pulse has been reflected from the first layer and before any pulse energy backscattered from the target has reached the first layer,
    the absorptivity of the second layer and the energy of the minor portion being sufficient to substantially alter the first layer in the region struck by the minor energy portion and thus to reduce the reflection along the reverse path from the front surface in said region sufficiently to prevent any substantial portion of the backscattered energy from reaching the source.

4. A method as in claim 3, wherein the minor portion of the pulse energy is about 10 to 25 percent of the total incident pulse energy.

5. A method as in claim 3, comprising the further step of moving the surface afterward to locate an intact area thereof substantially at the junction of the main and secondary paths, and then repeating the other steps.

6. In an apparatus for directing an incident radiation pulse from a source therein to a target positioned therein and preventing any substantial backscattering of radiation along the reverse path, the improvement comprising
    reflecting means comprising a surface of a material having high reflectivity located to direct a major portion of the pulse energy along a main path to the target,
    means for directing a minor portion of the incident pulse energy in a secondary path,
    means in the secondary path responsive to the minor portion of the pulse energy for actuating a substantial alteration of the reflecting surface in the area that reflects the pulse in the main path, after the entire pulse has been reflected from the surface and before any pulse energy backscattered from the target has reached the surface, to reduce the reflection along the reverse path from the surface in said region sufficiently to prevent any substantial portion of the backscattered energy from reaching the source.

7. Apparatus as in claim 6, wherein the means responsive to the minor energy portion provides an electrical discharge to the reflecting means to vaporize at least substantially the reflecting surface.

8. Apparatus as in claim 6, comprising also a nonlinear absorber in the main path that absorbs a substantially greater proportion of a low flux pulse than of a high flux pulse.

9. Apparatus as in claim 8, wherein the nonlinear absorber comprises a solution of a bleachable dye.

10. Apparatus as in claim 9, wherein the dye comprises phthalocyanine or cryptocyanine.

11. Apparatus as in claim 8, wherein the nonlinear absorber is located between the target and the reflecting means.

12. Apparatus as in claim 8, wherein the nonlinear absorber is located between the directing means and the source.

13. Apparatus as in claim 6, comprising also means in the main path for focusing the energy from the directing means through an aperture.

14. Apparatus as in claim 13, comprising also means for recollimating the beam beyond the aperture.

15. Apparatus as in claim 13, wherein the focusing means comprises a lens and an iris.

16. Apparatus as in claim 15, wherein the focusing means is located in a vacuum.

17. Apparatus as in claim 15, wherein the lens is located in a region of relatively low flux in the main path.

18. Apparatus as in claim 6, comprising also means in the main path for focusing the energy from the directing means in a gaseous region such that energy in excess of a predetermined quantity will break down the gas and form a plasma so that, while the predetermined quantity of energy may continue on to the target, any energy backscattered from the target is blocked by the plasma from reaching the source.

19. Apparatus as in claim 18, including an enclosure for the gaseous region, and wherein the focal length of the focusing means and the gas pressure in the enclosure are selected such as to break down the gas and form the plasma after passage of the predetermined quantity of energy.

20. Apparatus as in claim 6, wherein the reflecting means comprises a surface of a material that is affected by energy above an alteration threshold in such manner that its surface is altered, and thus its reflectivity is reduced, in any region impinged by such energy, whereby the beam reflected therefrom is substantially uniform even where the energy in a portion of the main beam incident thereon may be substantially above the alteration threshold.

21. Apparatus for directing an incident radiation pulse from a source therein to a target positioned therein and preventing any substantial backscattering of radiation along the reverse path, the improvement comprising
means for directing a major portion of the incident pulse energy in a main path beginning in a first direction and a minor portion in a secondary path beginning in a second direction,
reflecting means comprising the front surface of a first layer of a material having high reflectivity located in the main path to direct the major portion of the pulse energy along the main path to the target,
surface-altering means comprising a second layer of a material having high absorptivity to the radiation contacting the back surface of the first layer,
means located in the secondary path for directing the minor portion of the pulse energy over a longer route to the reflecting means to strike the second layer in the area that reflects the pulse in the main path, but on the side thereof that is away from the first layer, after the entire pulse has been reflected from the first layer and before any pulse energy backscattered from the target has reached the first layer,
the absorptivity of the second layer and the energy of the minor portion being sufficient to substantially alter the first layer in the region struck by the minor energy portion and thus to reduce the reflection along the reverse path from the front surface in said region sufficiently to prevent any substantial portion of the backscattered energy from reaching the source.

22. Apparatus as in claim 21, wherein the source is a laser.

23. Apparatus as in claim 21, wherein the minor portion of the pulse energy is about 10 to 25 percent of the total incident pulse energy.

24. Apparatus as in claim 21, wherein the surface-altering means causes a distortion in the front surface of the first layer.

25. Apparatus as in claim 21, wherein the directing means comprises a beam splitter.

26. Apparatus as in claim 25, further comprising means for moving the beam splitter to control the ratio of the major portion to the minor portion of the energy.

27. Apparatus as in claim 21, wherein the first layer comprises copper, gold, or silver.

28. Apparatus as in claim 27, wherein the second layer comprises germanium, silicon, lead sulphide, iron oxide, lead, tin, or cadmium.

29. Apparatus as in claim 21, wherein the second layer comprises a coating consisting essentially of germanium on a transparent support and the first layer comprises a coating consisting essentially of copper on the second layer.

30. Apparatus as in claim 21, wherein the source is a neodymium laser, the second layer comprises a vacuum deposited coating consisting essentially of germanium about 500 to 2,000 Angstroms thick on a substantially optically flat transparent support and the first layer comprises a vacuum deposited coating consisting essentially of copper about 1,000 to 5,000 Angstroms thick on the second layer.

31. Apparatus as in claim 30, wherein the energy of the minor portion is sufficient to remove a substantial portion of the first layer from the transparent support.

32. Apparatus as in claim 21, wherein the directing means in the secondary path comprises at least one reflector.

33. Apparatus as in claim 21, comprising also means for adjusting the length of the secondary path.

34. Apparatus as in claim 33, wherein the adjusting means comprises a reflector in the secondary path and means for controlling its position.

* * * * *